United States Patent
Park

(10) Patent No.: US 6,749,242 B2
(45) Date of Patent: Jun. 15, 2004

(54) GLOVE BOX DAMPER SYSTEM

(75) Inventor: Hyung-Sang Park, Kyunggi-do (KR)

(73) Assignee: Hyundai Mobis, Co., Ltd., Yongin-shi (KR)

(*) Notice: Subject to any disclaimer, the term of this patent is extended or adjusted under 35 U.S.C. 154(b) by 0 days.

(21) Appl. No.: 10/330,324

(22) Filed: Dec. 30, 2002

(65) Prior Publication Data

US 2004/0051334 A1 Mar. 18, 2004

(30) Foreign Application Priority Data

Sep. 13, 2002 (KR) .............................. 10-2002-0055747

(51) Int. Cl.⁷ .................................................. B60R 7/06
(52) U.S. Cl. ...................................... 296/37.12; 16/339
(58) Field of Search .......................... 296/37.12, 37.9, 296/37.7, 37.8, 37.13; 312/327, 326; 49/386; 16/339

(56) References Cited

U.S. PATENT DOCUMENTS 4,968,088 A * 11/1990 Schurmann .................. 49/386
5,275,456 A * 1/1994 Ishii et al. ................ 296/37.12
5,413,317 A * 5/1995 Spoerre ...................... 296/37.8
5,951,083 A * 9/1999 Bittinger et al. ......... 296/37.12

* cited by examiner

*Primary Examiner*—Lori L Coletta
(74) *Attorney, Agent, or Firm*—Greenblum & Bernstein, P.L.C.

(57) ABSTRACT

A damper system of a glove box includes fastening holes formed at side walls of the glove box, plates provided with through holes to be aligned with the fastening holes, a binding groove formed at one side of each plate, a fixing groove formed at the other side of each plate, a plate spring joined with the binding groove and the fixing groove, and protrusions provided at both sides of the glove box so that the plate spring can be fixed when the glove box pivots by the hinge, such that when the glove box pivots, the plate springs contact the protrusions, whereby the weight of the glove box can be reduced.

2 Claims, 3 Drawing Sheets

[FIG. 1] Prior Art
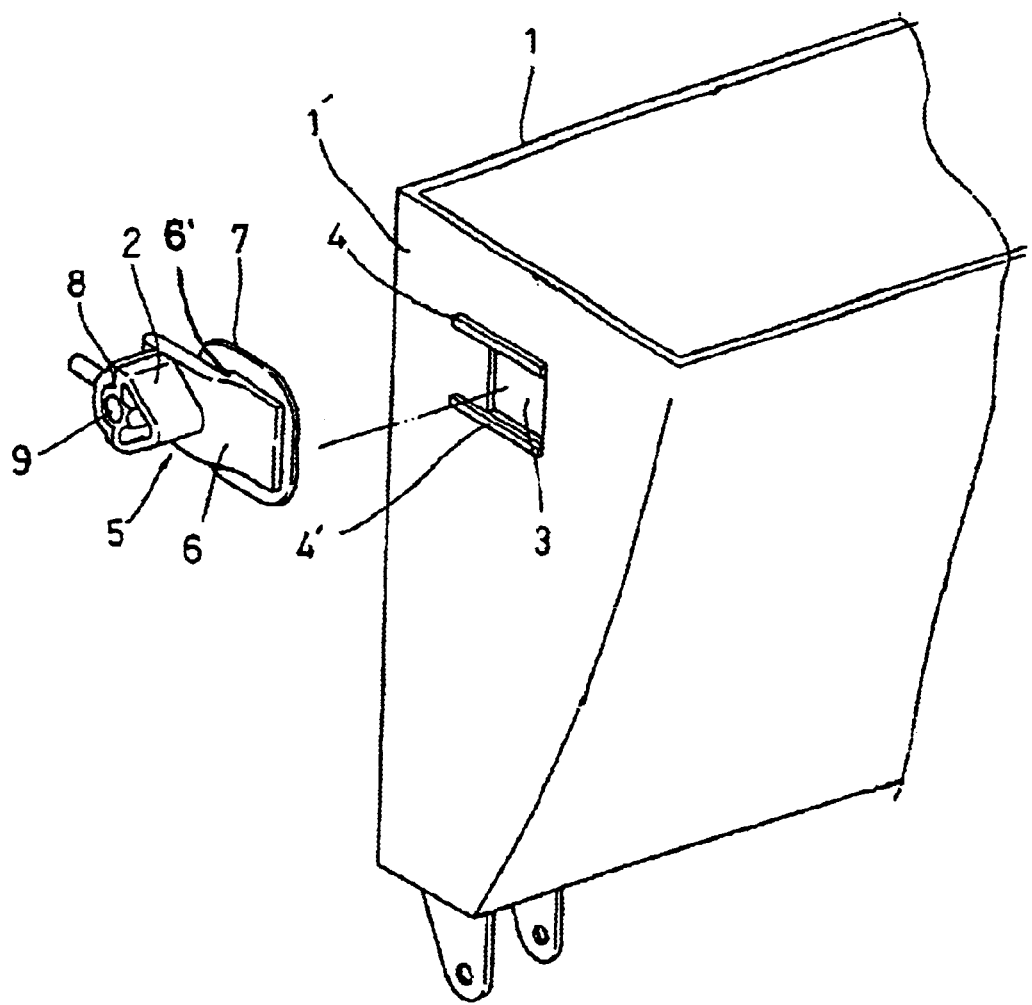

[FIG. 2]
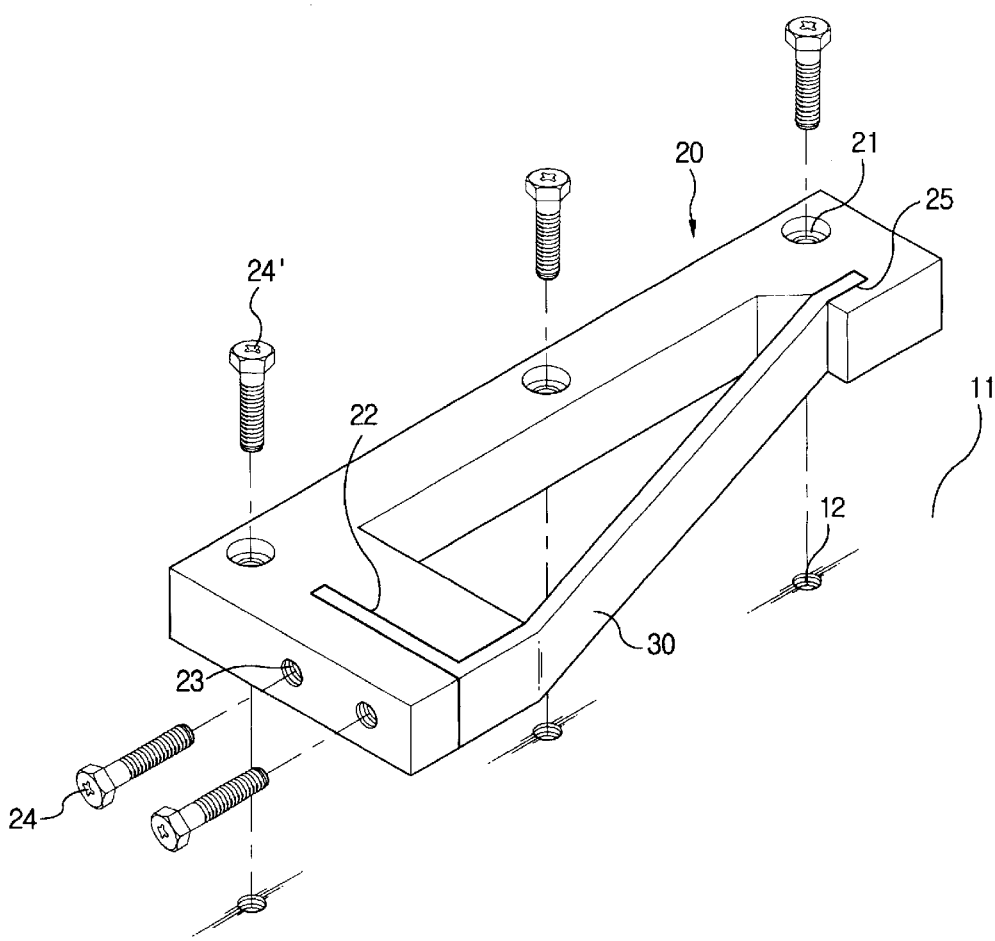

[FIG. 3]
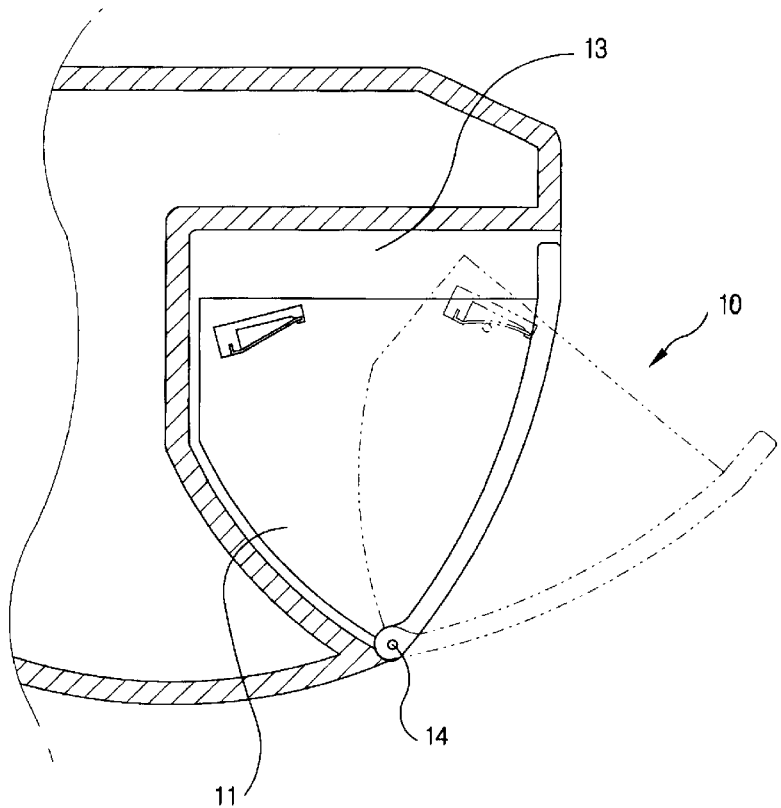
[FIG. 4]
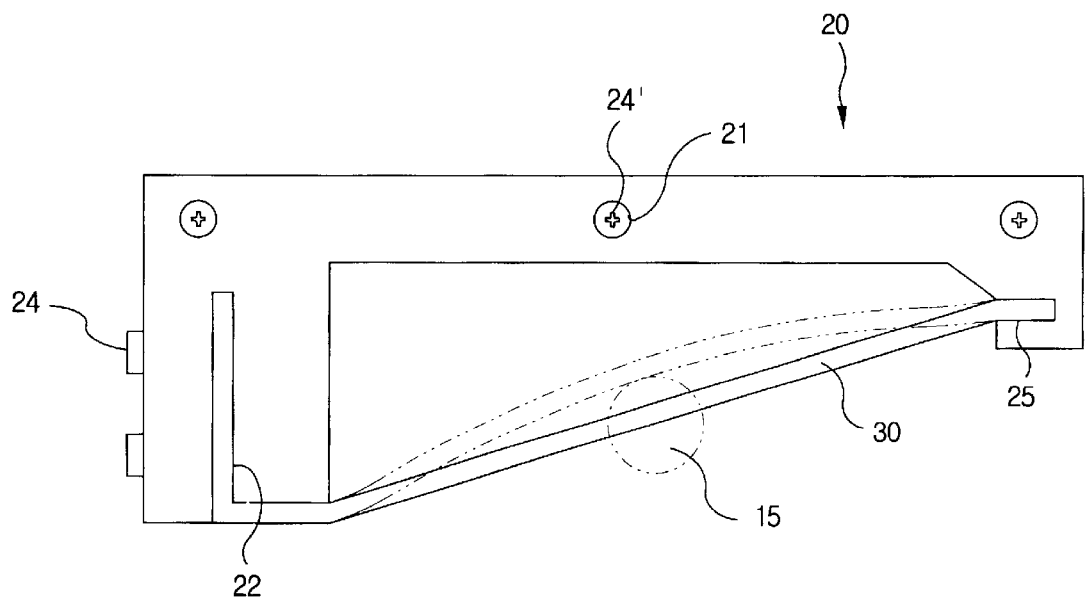

GLOVE BOX DAMPER SYSTEM

BACKGROUND OF THE INVENTION

1. Field of the Invention

The present invention relates to a glove box damper system, and more particularly a glove box damper system comprising plates attached to both side walls of the glove box, plate springs binding to the plates and protrusions formed at both side walls of a glove box receiving part, in which when the glove box is opened, the plate springs contact the protrusions, whereby the glove box can stop at a predetermined position and control impact and its weight.

2. Description of the Related Art

In general, conventional glove box damper systems, as shown in FIG. 1, have a glove box 1 provided at the lower end with a lower bracket engaged with a hinge. The glove box 1 is also provided at both side walls 1' with rectangular supporting holes 3. Projected parts 4,4' are formed with a predetermined interval at upper and lower side of the rectangular supporting hole 3. A damper 5 is formed to have the same width with the supporting hole 3 on a side 1' of a synthetic resin substrate 6 with an interval and width identical to those of the projected parts 4,4'. The system has a supporting part 6' having the same cross-section with the supporting hole 3 and a engaging piece 8 and support plate 9 formed in one body at the opposite side to an engaging plate 7. A main body 2 of the rubber damper is inserted into the engaging piece 8 so that the main body 2 of the damper is supported at one side by the engaging piece 8. Then, the main body 2 of the damper and the support plate 9 are inserted in the rectangular hole 3 inside the side wall of the glove box 1 in the direction of the projected parts 4,4' and drawn out of the side wall. Accordingly, the engaging plate is supported by the inside of the side wall around the rectangular hole 3, the support part 6' is supported by the rectangular hole 3 and the upper and lower surfaces of the support plate 9 is inserted in and supported by the projected parts 4,4'.

However, the structure of the glove box damper system is supported at the upper and lower parts between the projected parts, by inserting the main body of the damper and the supporting plate from the inside of the side wall into the rectangular supporting hole in the direction of the projected parts. Therefore, it requires a lot of process to bind the damper to the side wall of the glove box. Also, it is difficult to confirm that the damper is fixed in a proper place. In addition, since the supporting plate should be released in a straight line from the projected parts for separation of the damper, the process is complex and inexpedience.

SUMMARY OF THE INVENTION

To solve the above-indicated problems, it is, therefore, an object of the present invention to provide a damper system of a glove box which can be assembled and disassembled in a simple and convenient way and have a reduced weight by binding a plate spring to a plate with a binding groove and fixing groove.

To achieve the above object, there is provided a damper system of a glove box comprising: fastening holes formed at side walls of the glove box; plates provided with through holes to be aligned with the fastening holes; a binding groove formed at one side of each plate; a fixing groove formed at the other side of each plate; a plate spring joined with the binding groove and the fixing groove; and protrusions provided at both sides of the glove box so that the plate spring can be fixed when the glove box pivots by the hinge.

BRIEF DESCRIPTION OF THE DRAWINGS

The above objects, features and advantages of the present invention will become more apparent from the following detailed description when taken in conjunction with the accompanying drawings, in which:

FIG. 1 is a partly broken perspective view of a conventional damper system of a glove box;

FIG. 2 is a perspective view of the plate according to the present invention;

FIG. 3 is a side view of the damper system of the present invention according to operation status; and FIG. 4 is an enlarged view of the main part of FIG. 3.

DETAILED DESCRIPTION OF THE PREFERRED EMBODIMENT

A preferred embodiment of the present invention will now be described with reference to the accompanying drawings.

A glove box receiving part 13 is provided at the lower ends of both sides with pivot assembly holes 14 to which a hinge of a glove box 10 is inserted.

The glove box 10 is provided at side walls 11' with fastening holes 12. Here, a plurality of binding holes may be formed.

A plate 20 which is attached by the fastening holes 12 is provided with through holes 21 at positions corresponding to those of the fastening holes 12.

The through holes 21 have preferably a step with a predetermined depth so that a head of a bolt 24' protrudes above the outer surface of the plate 20.

The plate 20 is also provided at one side with a binding groove 22.

The groove 22 may be formed to have a plurality of pleated parts so that a plate spring 30 can be joined or may be provided with binding holes 23 in which bolts 24 is fastened.

The plate 20 is provided at the other side with a fixing groove 25.

One end of the plate spring 30 binds with the binding groove 22 and the other end is fixed at the fixing groove 25.

The plate spring 30 is preferably formed to have a tilt from the binding groove 22 to the fixing groove 25.

Therefore, the binding groove 22 has a height higher than that of the fixing groove 25.

Meanwhile, the glove box receiving part 13 is provided at both sides with protrusions 15 which contacts with the plate spring 30, thereby supporting the glove box 10, when the glove box 10 pivots by the hinge.

The assembly of the damper system of the glove box according to the present invention as described above will be explained.

One end of the plate spring 30 is inserted and fixed in the fixing groove 25 and the other end is inserted in the binding groove 22 and fastened with the bolts 24.

The plate 20 with the plate spring 30 attached is placed so that the through holes 21 formed on the plate 20 is aligned with the fastening holes 12 formed on the both side walls 11 of the glove box 10.

Then, the through holes 21 are fastened with the bolts 24' whereby the plate 20 is attached to the side wall of glove box 10.

The glove box 10 with the plates 20 attached is joined with the glove box receiving part 13 by the hinge.

The operation of the damper system of the glove box according to the present invention constructed and assembled as described above will be explained. The explanation will make reference to FIG. 3, which is a side view of the damper system of the present invention according to operation status, and FIG. 4, which is an enlarged view of the main part of FIG. 3.

When the glove box 10 is opened by pivoting around the hinge, the plate springs 30 contact the protrusions 15 formed on the both side walls of the glove box receiving part 13, upon which friction is generated between the plate springs and the protrusions and the plate springs are elastically deformed.

Therefore, the glove box 10 is slowly opened due to the friction between the plate springs 30 and the protrusions 15 and the elastic deformation of the plate springs 30. That is, the plate springs 30 and the protrusions 15 serve as dampers to control the pivot speed of the glove box 10.

According to the present invention as described above, the plate which is intended to be attached to the glove box can be attached to and dissembled from the glove box in a simple and convenient way. Also, it is possible to provide a damper system of the glove box which can control the weight of the glove box.

As described above, the damper system of the glove box according to the present invention has the following effects.

Since the plate springs contact the protrusions when the glove box pivots, the opening speed of the glove box can be controlled.

Since the binding groove and the fixing groove have heights different from each other, whereby the plate spring has a tilt, the opening speed of the glove box can be gradually reduced at the late stage of the contact between the protrusions and the plate springs rather than the early stage of the contact.

Since the plate springs contacts and are supported by the protrusions, they are elastic against the force acting on the glove box.

What is claimed is:

1. A damper system for a glove box, the glove box having a hinge and fastening holes formed at side walls thereof and further having a protrusion, the damper system comprising:

a plate having through holes to be aligned with the fastening holes;

a binding groove formed at one side of said plate;

a fixing groove formed at the other side of said plate; and a plate spring joined with the binding groove and the fixing groove, said plate spring configured to engage the protrusion when the glove box pivots about the hinge.

2. The damper system for the glove box according to claim 1, wherein;

the binding groove and the fixing groove have heights different from each other; and the plate spring has a tilt.

* * * * *